United States Patent Office 3,234,294
Patented Feb. 8, 1966

3,234,294
PROCESS FOR THE PREPARATION OF
PERFLUOROCARBON IODIDES
Raymond E. Parsons, Wilmington, Del., assignor to E. I. du Pont de Nemours and Company, Wilmington, Del., a corporation of Delaware
No Drawing. Filed Dec. 20, 1962, Ser. No. 246,024
The portion of the term of the patent subsequent to May 5, 1981, has been disclaimed
4 Claims. (Cl. 260—653.1)

This invention relates to a process for converting saturated perfluorocarbon iodides to higher-molecular-weight iodides of this same series.

Perfluorocarbon iodides are well known materials, and numerous references to them are found in the prior art. For example, the "Journal of the Chemical Society," London (1953), p. 3761, discloses that perfluoroalkyl iodides will react photochemically with tetrafluoroethylene to produce higher-molecular-weight homologs. This publication also discloses that a similar reaction can be effected by heating a mixture of trifluoroiodomethane and tetrafluoroethylene in an autoclave to temperatures of 200–220° C.

In the present invention, perfluorocarbon iodides are reacted with tetrafluoroethylene in the presence of a catalyst system comprised of iodine pentafluoride and an antimony halide to produce higher-molecular-weight perfluorocarbons. These catalysts make it possible to use significantly lower temperatures than have been previously used in similar reactions. Moreover, the reaction at these lower temperatures does not require the presence of actinic light in the reaction zone. According to the present invention, the reaction between the perfluorocarbon iodide and tetrafluoroethylene is carried out by contacting in a closed reaction zone, at a temperature of about 0° C. to 110° C., a saturated perfluorocarbon iodide containing up to 20 carbon atoms, tetrafluoroethylene, iodine pentafluoride, and at least one halide from the group consisting of antimony pentafluoride, antimony trifluoride, and antimony pentachloride. The amount of iodine pentafluoride used in the reaction is generally in the range of about 0.005 to 0.1 mol per mol of the starting perfluorocarbon iodide, and the amount of antimony halide is generally in the range of about 0.0025 to 0.1 mol per mol of the starting perfluorocarbon iodide. The amount of tetrafluoroethylene used is not especially critical so long as it is sufficient to effect the reaction. Since the reaction is exothermic, a temperature rise will be noted if the temperature of the reaction zone is otherwise kept constant.. The upper limit on the amount of tetrafluoroethylene is not critical. The introduction of tetrafluoroethylene can be continued until no further reaction takes place, or the reaction can be terminated at an intermediate stage by discontinuing the introduction of the tetrafluoroethylene. In either instance, the end product will be a perfluorocarbon iodide having a higher average molecular weight than the iodide initially present at the start of the reaction. Any catalyst present in the end product may be removed by washing with water.

The saturated perfluorocarbon iodides used in the present process may be a single compound or a mixture of compounds having the formula $R_fI$ wherein $R_f$ is a saturated perfluorocarbon group. These saturated perfluorocarbon iodides include open-chain compounds of formula $C_nF_{2n+1}I$ and saturated cyclic compounds of formula $C_mF_{2m}I$. The open-chain compounds include straight-chain compounds such as $F(CF_2)_nI$ and branched-chain compounds such as $(CF_3)_2CFI$
$CF_3[CF_2CF(CF_3)]_aI$
$C_2F_5[CF_2CF(CF_3)]_aI$
$C_3F_7[CF_2CF(CF_3)]_aI$
$(CF_3)_2CF(CF_2CF_2)_bI$ and $(CF_3)_2CF[CF_2CF(CF_3)]_cI$ containing up to 20 carbons. The cyclic compounds may be simple ring compounds such as

or substituted rings such as

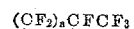

(wherein $r=3, 4, 5$ and $s=2, 3, 4$). Those CFI containing less than six carbons, particularly the straight-chain compounds $F(CF_2)_nI$ and especially perfluoroethyliodide, are preferred. Examples of perfluorocarbon iodides that can be used as starting materials in the present invention are: perfluoromethyl iodide, perfluoroethyl iodide, n-perfluorobutyl iodide, n-perfluorohexyl iodide, n-perfluorooctyl iodide, n-perfluorodecyl iodide, n-perfluorotetradecyl iodide, n-perfluorooctadecyl iodide, 2 - iodoperfluoropentane, 2-iodoperfluoro-4-methylheptane, perfluoroisopentyl iodide, perfluoroisoheptyl iodide, 2-iodoperfluoro-4,6-dimethylnonane, perfluoroisononyl iodide, perfluorocyclobutyl iodide, perfluorocyclopentyl iodide, perfluorocyclohexyli iodide, perfluoro-2-methylcyclobutyl iodide, and perfluoro-2-methylcyclohexyl iodide. The preparation of these iodides is described in the following references: J.A.C.S., 79, 2549 (1957), French Patent 1,223,259, U.S. Patent 2,975,220, and Canadian Patent 583,873.

The end product of the reaction is a mixture of perfluorocarbon iodides of the same general formula as the starting material, but the average molecular weight of such mixture is higher than the molecular weight of the starting perfluorocarbon iodides. Analyses of such mixtures have shown that they contain a series of perfluorocarbon iodides in which each member of the series differs from the next higher member by a —$CF_2$—$CF_2$— group. Such members may be separated by distillation or other convenient means. Perfluorocarbon iodides are most often used in the form of mixtures. Therefore, it is usually necessary only to remove those containing less than the desired number of carbons. This can be readily done with a distillation-stripping operation, thus leaving the desired product which can be further processed without additional purification. A typical use which does not require individual separation of the iodides is the preparation of oil and water repellents via the following series of reactions. The first reaction is that of the present invention, while the last three are known reactions for the products of this invention.

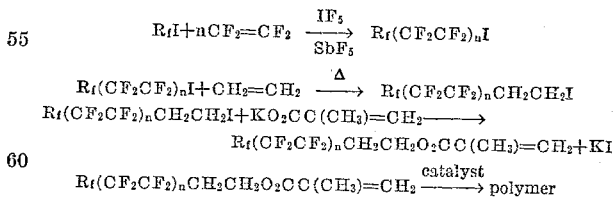

Polymers thus obtained are useful oil and water repellents for textiles.

The present process is carried out in a closed system under autogenous pressure since tetrafluoroethylene and some perfluorocarbon iodide starting materials are low-boiling liquids. Conventional equipment can be used in this system, and an ordinary autoclave fabricated from steel, nickel, or nickel alloys, such as "Inconel" is quite suitable as the reaction vessel. It is preferable to provide means for agitation within the reaction zone, and the system should also be provided with means for both cooling and heating the reaction mixture.

In a preferred method of operation, the perfluorocarbon iodide and the catalysts are first placed in the reaction zone and then the gaseous tetrafluoroethylene is introduced thereto in increments until the total desired amount has been added. As previously mentioned, the reaction is exothermic, and the incremental addition of the tetrafluoroethylene makes it possible to maintain better control of the reaction. The amount of tetrafluoroethylene which is added at any one time is dependent upon how efficiently the equipment removes the heat of the reaction. Care should be exercised to avoid excessive heat since this may lead to an explosive reaction. The reaction temperature may vary from about 0° C. to about 110° C. The preferred temperature range is about 40–80° C. and about 60° C. is a preferred specific temperature. Reaction temperatures above 110° C. are less desirable since the catalysts seem to be consumed slowly, perhaps by reaction with the perfluorocarbon iodide compounds.

It has been previously pointed out that the mol ratio of iodine pentafluoride to the starting perfluorocarbon iodide is generally in the range of about 0.005:1 to 0.1:1. It has also been previously set forth that the mol ratio of antimony halide to the starting perfluorocarbon iodide is in the range of .0025:1 to 0.1:1. It would be possible to operate outside of these ranges, but best results are obtained when these limits are observed. If amounts less than those previously specified as used, the reaction rate is very slow. On the other hand, amounts in excess of the specified upper limits serve no useful purpose. A preferred range for the amount of iodine pentafluoride is about 0.01–0.05 mol per mol of starting perfluorocarbon iodide. A preferred range for the amount of antimony halide is about 0.005–0.025 mol of the halide per mol of the starting perfluorocarbon iodide. The preferred antimony catalyst is antimony pentafluoride.

For a clearer understanding of the invention, the following specific examples are given. These examples are intended to be merely illustrative of the invention and not in limitation thereof. Unless otherwise specified, all parts are by weight.

Example I

A mixture of 2.2 parts (0.01 mol) of iodine pentafluoride and 1.1 parts (0.005 mol) of antimony pentafluoride was prepared at room temperature in "Hastelloy-C" lined autoclave. The autoclave was cooled to below 0° C., evacuated, and 246 parts (1.00 mol) of pentafluoroethyl iodide was added. The reaction mixture was then heated with agitation to 60° C. Tetrafluoroethylene vapor was added in small increments (5 parts each) to the autoclave until a total of 52 parts (0.52 mol) of tetrafluoroethylene had been added. The reaction was mildly exotheric with heat increases of 1° to 4° C. recorded with each tetrafluoroethylene addition. The tetrafluoroethylene pressure dropped rapidly from about 100 p.s.i.g. after each addition to about 60 p.s.i.g. (the vapor pressure of pentafluoroethyl iodide at this temperature is 60 p.s.i.g.) after each addition. The total reaction time was 40 minutes. Analysis of the reaction product by vapor phase chromatography indicated that the reaction mass contained (weight percent) 53.0% perfluoroethyl iodide, 13.6% n-perfluorobutyl iodide, 10.1% n-perfluorohexyl iodide, 8.1% n-perfluorooctyl iodide, 5.6% n-perfluorodecyl iodide, 3.5% n-perfluorododecyl iodide, 2.3% n-perfluorotetradecyl iodide, and 3.8% unidentified, higher-molecular-weight perfluoroalkyl iodides. All of the tetrafluoroethylene was consumed, and the material recovery was essentiallly complete.

If desired, these products could be separated by fractional distribution giving the following: $CF_3CF_2I$, B.P. 13° C.; $F(CF_2)_4I$, B.P. 66–68° C.; $F(CF_2)_6I$, B.P. 116–119° C.; $F(CF_2)_8I$, B.P. 95° C. at 103 mm.; $F(CF_2)_{10}I$, B.P. 102–106° C. at 45 mm.; $F(CF_2)_{12}I$, B.P. 108–110° C. at 18 mm.; $F(CF_2)_{14}I$, B.P. 93–97° C. at 5 mm.

Example II

Example I was repeated using 173 parts (0.50 mol) of n-perfluorobutyl iodide, 2.2 parts (0.01 mol) iodine pentafluoride, 1.1 parts (0.005 mol) antimony pentafluoride and 29 parts (0.29 mol) of tetrafluoroethylene at 60° C. The product contained, in weight percent, 1.9% perfluoroethyl iodide, 51.8% n-perfluorobutyl iodide, 25.4% n-perfluorohexyl iodide, 12.0% n-perfluorooctyl iodide, 4.7% n-perfluorodecyl iodide, 1.8% n-perfluorododecyl iodide, 0.7% n-perfluorotetradecyl iodide, and 1.7% unidentified, higher-molecular-weight products. All of the tetrafluoroethylene was consumed, and the material recovery was essentially complete.

Example III

Example I was repeated using 100 parts (0.224 mol) of n-perfluorohexyl iodide, 2.2 parts (0.01 mol) of iodine pentafluoride, 1.1 parts (0.005 mol) antimony pentafluoride and 15 parts (0.15 mol) of tetrafluoroethylene at 60° C. The product contained, in weight percent, 3.5% perfluoroethyl iodide, 38.2% n-perfluorohexyl iodide, 26.2% n-perfluorooctyl iodide, 14.7% n-perfluorodecyl iodide, 8.5% n-perfluorododecyl iodide, 3.6% n-perfluorotetradecyl iodide, and 4.9% unidentified, higher-molecular-weight products. All of the tetrafluoroethylene was consumed, and the material recovery was essentially complete.

Example IV

Example I was repeated by adding 5 part increments of tetrafluoroethylene to the reaction mixture which was initially at room temperature (20° C.). The temperature rose, due to the heat of reaction, to a maximum of 49° C. in 75 minutes. A total of 58 parts (0.58 mol) of tetrafluoroethylene were added. The product was found to contain, in weight percent, 22.8% perfluoroethyl iodide, 23.6% n-perfluorobutyl iodide, 10.4% n-perfluorohexyl iodide, 11.4% n-perfluorooctyl iodide, 9.4% n-perfluorodecyl iodide, 7.0% n-perfluorododecyl iodide, 7.2% n-perfluorotetradecyl iodide, and 8.2% unidentified, higher-molecular-weight products. All of the tetrafluoroethylene was consumed, and the material recovery was essentially complete.

Example V

Example I was repeated by adding tetrafluoroethylene in 5 part increments (total 20 parts—0.20 mol) at 100° C. After 20 parts were added the pressure failed to drop, indicating that the catalyst was no longer operative. The product was found to contain, in weight percent, 77.0% perfluoroethyl iodide, 11.3% n-perfluorobutyl iodide, 4.9% n-perfluorohexyl iodide, 2.6% n-perfluorooctyl iodide, 1.3% n-perfluorodecyl iodide, 0.7% n-perfluorododecyl iodide, and 2.8% unidentified, higher-molecular-weight products. All of the tetrafluoroethylene was consumed, and the material recovery was essentially complete.

Example VI

Example I was repeated using 246 parts of perfluoroethyl iodide (1 mol), 1.1 parts (0.005 mol) of iodine pentafluoride, 0.55 part (0.0025 mol) of antimony pentafluoride, and 62 parts (0.62 mol) of tetrafluoroethylene at 60° C. The product was found to contain, in weight percent, 64% perfluoroethyl iodide, 9.2% n-perfluorobutyl iodide, 6.2% n-perfluorohexyl iodide, 5.4% n-perfluorooctyl iodide, 4.1% n-perfluorodecyl iodide, 3.0% n-perfluorododecyl iodide, 2.7% n-perfluorotetradecyl iodide, and 5.4% unidentified, higher-molecular-weight products. All of the tetrafluoroethylene was consumed, and the material recovery was essentially complete.

Example VII

A mixture of 4.4 parts (0.02 mol) of iodine pentafluoride and 1.8 parts (0.01 mol) of antimony trifluoride was prepared in a "Hastelloy-C" lined autoclave. The autoclave was cooled to 0° C., evacuated, and 123 parts (0.50 mol) of perfluoroethyl iodide was added to the autoclave. The mixture was heated to 60° C., with agitation and tetrafluoroethylene was added in increments of 2–5 parts until 60 parts (0.60 mol) had been added. The final pressure was 320 p.s.i.g. The pressure dropped after 8 hours to 125 p.s.i.g. The cooled product was analyzed as in Example I indicating, in weight percent, 57.0% perfluoroethyl iodide, 4.9% n-perfluorobutyl iodide, 4.7% n-perfluorohexyl iodide, 4.9% n-perfluorooctyl iodide, 5.6% n-perfluorodecyl iodide, 5.3% n-perfluorododecyl iodide, and 18.5% unidentified products, mostly higher-molecular-weight materials. All of the tetrafluoroethylene was consumed, and the material recovery was nearly complete.

Example VIII

A mixture of 2.2 parts of iodine pentafluoride (0.01 mol) and 1.5 parts (0.005 mol) of antimony pentachloride was prepared in a "Hastelloy-C" lined autoclave. The autoclave was cooled to below 0° C., evacuated, and 246 parts (1.0 mol) of perfluoroethyl iodide was added. The mixture was heated with agitation to 60° C. Tetrafluoroethylene was added in increments of 5 parts until 20 parts (0.2 mol) had been added, at which time the pressure was 160 p.s.i.g. The pressure dropped to 130 p.s.i.g. after 1 hour. The product, analyzed as before, contained, in weight percent, 87.8% perfluoroethyl iodide, 3.7% n-perfluorobutyl iodide, 2.0% n-perfluorohexyl iodide, 1.5% n-perfluorooctyl iodide, 1.1% n-perfluorodecyl iodide, 1.0% n-perfluorododecyl iodide, 0.6% n-perfluorotetradecyl iodide, and 2.4% unidentified, higher-molecular-weight products. All of the tetrafluoroethylene was consumed, and the material recovery was essentially complete.

Example IX

Example I was repeated using 77 parts (0.28 mol) of perfluoroisopropyl iodide, 2.2 parts (0.01 mol) of iodine pentafluoride, 1.1 parts (0.005 mol) of antimony pentafluoride, and 20 parts (0.20 mol) of tetrafluoroethylene at 60° C. The product contained, in weight percent, 37.9% $(CF_3)_2CFI$, 11.7% $(CF_3)_2CF(CF_2)_2I$, 16.9% $(CF_3)_2CF(CF_2)_4I$, 11.5% $(CF_3)_2CF(CF_2)_6I$, 7.2% $(CF_3)_2CF(CF_2)_8I$, 4.6% $(CF_3)_2CF(CF_2)_{10}I$, 2.8% $(CF_3)_2CF(CF_2)_{12}I$ and lesser amounts of unidentified, higher-molecular-weight products. The tetrafluoroethylene was essentially all consumed, and the material recovery was essentially complete.

It can be seen from the foregoing examples that the average molecular weight of the end product of this invention will vary depending upon the choice of materials and the conditions used in the reaction. As a general rule, the more tetrafluoroethylene used, the higher the average molecular weight of the end products. The average molecular weight is also affected by the choice of the antimony catalyst. Both antimony trifluoride and antimony pentachloride have a tendency to produce higher-molecular-weight products than does the antimony pentafluoride. Experience has also shown that perfluoroethyl iodide does not react as readily as some of the longer-chain perfluoroalkyl iodides. It is therefore believed that the longer-chain perfluoroalkyl iodides which form in the reaction compete with the perfluoroethyl iodides in the reaction with tetrafluoroethylene. When these matters are taken into consideration, it has been found that it is relatively easy to conduct trial runs which will establish a particular set of conditions for producing an end product of a desired average molecular weight.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for converting a saturated perfluorocarbon monoiodide to higher-molecular-weight, saturated perfluorocarbon monoiodides comprising introducing into a closed reaction zone at 0–110° C. a saturated perfluorocarbon monoiodide containing up to 20 carbon atoms, tetrafluoroethylene, iodine pentafluoride, and an antimony halide selected from the group consisting of antimony pentafluoride, antimony trifluoride, and antimony pentachloride, said iodine pentafluoride being present in an amount of about 0.005 to 0.1 mol per mol of the starting perfluorocarbon iodide, the amount of said antimony halide being about 0.0025 to 0.1 mol per mol of the starting perfluorocarbon iodide and the amount of tetrafluoroethylene introduced into the reaction zone being sufficient to cause an exothermic reaction.

2. A process for converting a saturated perfluorocarbon monoiodide to higher-molecular-weight, saturated perfluorocarbon monoiodides comprising introducing into a closed reaction zone at about 40° C. to 80° C. a perfluoroalkyl monoiodide containing less than 6 carbon atoms, tetrafluoroethylene, iodine pentafluoride, and an antimony halide selected from the group consisting of antimony pentafluoride, antimony trifluoride, and antimony pentachloride, said iodine pentafluoride being present in an amount of about 0.01 to 0.05 mol per mol of the starting perfluoroalkyl iodide, the amount of said antimony halide being about 0.005 to 0.025 mol per mol of starting perfluoroalkyl iodide, and the amount of tetrafluoroethylene introduced into the reaction zone being sufficient to cause an exothermic reaction.

3. The process of claim 2 in which the starting perfluoroalkyl iodide is perfluoroethyl iodide.

4. The process of claim 2 in which the antimony halide is antimony pentafluoride.

References Cited by the Examiner
UNITED STATES PATENTS 3,006,973  10/1961  Hauptschein et al. __ 260—653.8
3,132,185  5/1964  Parsons _____ 260—653.1

LEON ZITVER, *Primary Examiner.*

DANIEL D. HORWITZ, *Examiner.*